(12) United States Patent
Sole et al.

(10) Patent No.: US 9,049,443 B2
(45) Date of Patent: Jun. 2, 2015

(54) METHODS AND APPARATUS FOR TRANSFORM SELECTION IN VIDEO ENCODING AND DECODING

(75) Inventors: Joel Sole, Plainsboro, NJ (US); Peng Yin, Ithaca, NY (US); Yunfei Zheng, Plainsboro, NJ (US); Cristina Gomila, Princeton, NJ (US)

(73) Assignee: THOMSON LICENSING, Boulogne-Billancourt (FR)

(*) Notice: Subject to any disclaimer, the term of this patent is extended or adjusted under 35 U.S.C. 154(b) by 24 days.

(21) Appl. No.: 13/138,287

(22) PCT Filed: Oct. 21, 2009

(86) PCT No.: PCT/US2009/005730
§ 371 (c)(1),
(2), (4) Date: Jul. 27, 2011

(87) PCT Pub. No.: WO2010/087808
PCT Pub. Date: Aug. 5, 2010

(65) Prior Publication Data
US 2011/0293002 A1    Dec. 1, 2011

Related U.S. Application Data

(60) Provisional application No. 61/147,705, filed on Jan. 27, 2009, provisional application No. 61/207,783, filed on Feb. 17, 2009.

(51) Int. Cl.
| | | |
|---|---|---|
| *H04N 7/12* | (2006.01) | |
| *H04N 11/02* | (2006.01) | |
| *H04N 19/137* | (2014.01) | |
| *H04N 19/196* | (2014.01) | |
| *H04N 19/159* | (2014.01) | |
| *H04N 19/176* | (2014.01) | |
| *H04N 19/119* | (2014.01) | |
| *H04N 19/147* | (2014.01) | |
| *H04N 19/46* | (2014.01) | |
| *H04N 19/122* | (2014.01) | |
| *H04N 19/61* | (2014.01) | |
| *H04N 19/463* | (2014.01) | |
| *H04N 19/136* | (2014.01) | |
| *H04N 19/86* | (2014.01) | |

(52) U.S. Cl.
CPC ........... *H04N 19/137* (2014.11); *H04N 19/197* (2014.11); *H04N 19/159* (2014.11);*H04N19/176* (2014.11); *H04N 19/119* (2014.11); *H04N 19/147* (2014.11); *H04N 19/46* (2014.11); *H04N 19/122* (2014.11); *H04N 19/61* (2014.11); *H04N 19/463* (2014.11); *H04N 19/136* (2014.11); *H04N 19/86* (2014.11)

(58) Field of Classification Search
CPC .................. H04N 19/00278; H04N 19/00781; H04N 19/00084; H04N 19/0545; H04N 19/00175; H04N 19/00042; H04N 19/00212; H04N 19/00218; H04N 19/00157; H04N 19/00072; H04N 19/00145; H04N 19/00551; H04N 19/00109; H04N 19/00363; H04N 19/00763; H04N 19/00775; H04N 19/00969; H04N 19/00024; H04N 19/00121; H04N 19/00127; H04N 19/00133; H04N 19/00139; H04N 19/00303; H04N 19/00369; H04N 19/00375; H04N 19/00569; H04N 19/00884; H04N 19/00903; H04N 19/00018; H04N 19/00078; H04N 19/00096; H04N 19/00351; H04N 19/00357; H04N 19/0009; H04N 19/00163; H04N 19/00187; H04N 19/00193; H04N 19/002; H04N 19/00266; H04N 19/00284; H04N 19/0029; H04N 19/00533; H04N 19/00696; H04N 19/00733; H04N 19/00909; G06T 9/004; G06T 9/007
USPC .......... 375/240.02, 240.18; 348/395.1, 400.1, 348/403.1, 408.1; 382/248, 250, 276, 277, 382/281
See application file for complete search history.

(56) References Cited

U.S. PATENT DOCUMENTS

| | | | |
|---|---|---|---|
| 5,461,421 A * | 10/1995 | Moon | 375/240.13 |
| 5,481,553 A | 1/1996 | Suzuki et al. | |
| 5,585,855 A * | 12/1996 | Ozaki et al. | 375/240.2 |
| 5,590,139 A | 12/1996 | Suzuki et al. | |
| 5,592,228 A | 1/1997 | Dachiku et al. | |
| 5,721,588 A * | 2/1998 | Fujiwara et al. | 375/240.15 |
| 7,317,759 B1 | 1/2008 | Turaga et al. | |
| 7,539,355 B2 | 5/2009 | Nakayama | |
| 7,577,306 B2 | 8/2009 | Wu et al. | |
| 7,706,622 B2 * | 4/2010 | Kobayashi | 382/239 |
| 7,925,107 B2 * | 4/2011 | Kim et al. | 382/248 |
| 8,086,053 B2 * | 12/2011 | Kim et al. | 382/239 |
| 8,098,940 B2 | 1/2012 | Etoh et al. | |
| 8,179,962 B2 * | 5/2012 | Lim et al. | 375/240.02 |
| 8,285,068 B2 * | 10/2012 | Schoenblum | 382/260 |
| 8,290,041 B2 * | 10/2012 | Suzuki et al. | 375/240.13 |
| 8,406,299 B2 * | 3/2013 | Karczewicz | 375/240.15 |
| 8,619,853 B2 | 12/2013 | Ye et al. | |
| 2002/0126761 A1 | 9/2002 | Gesnot et al. | |
| 2002/0172398 A1 | 11/2002 | Hayashi | |
| 2003/0103679 A1 | 6/2003 | Etoh et al. | |
| 2004/0125204 A1 | 7/2004 | Yamada et al. | |
| 2005/0195900 A1 | 9/2005 | Han | |
| 2005/0196063 A1 | 9/2005 | Guangxi et al. | |
| 2005/0249291 A1 * | 11/2005 | Gordon et al. | 375/240.18 |
| 2006/0153424 A1 | 7/2006 | Hayashi | |
| 2006/0268982 A1 | 11/2006 | Lee et al. | |
| 2007/0065026 A1 | 3/2007 | Lee et al. | |
| 2007/0098078 A1 | 5/2007 | Kim et al. | |
| 2007/0206679 A1 | 9/2007 | Lim et al. | |
| 2008/0008240 A1 | 1/2008 | Suzuki et al. | |
| 2008/0089420 A1 | 4/2008 | Karczewicz | |
| 2008/0095238 A1 | 4/2008 | Wu et al. | |
| 2008/0260030 A1 | 10/2008 | Karczewicz | |
| 2008/0310504 A1 * | 12/2008 | Ye et al. | 375/240.02 |
| 2008/0310512 A1 | 12/2008 | Ye et al. | |
| 2009/0097571 A1 * | 4/2009 | Yamada et al. | 375/240.25 |
| 2009/0238271 A1 | 9/2009 | Kim et al. | |
| 2009/0262800 A1 | 10/2009 | Zhang et al. | |

FOREIGN PATENT DOCUMENTS

| | | |
|---|---|---|
| CN | 1496653 A | 5/2004 |
| CN | 1874521 A | 12/2006 |
| CN | 1926873 A | 3/2007 |
| CN | 1933601 A | 3/2007 |
| CN | 101019435 A | 8/2007 |
| EP | 1370087 A1 | 12/2003 |
| JP | 61-285869 A | 12/1986 |
| JP | 63-224491 A | 9/1988 |
| JP | 06-284412 A | 10/1994 |
| JP | 11-234638 A | 8/1999 |
| JP | 2002-314428 A | 10/2002 |
| JP | 2002-325170 A | 11/2002 |
| JP | 2003-204550 A | 7/2003 |
| JP | 2004-523815 A | 8/2004 |
| JP | 2005-167655 A | 6/2005 |
| JP | 2001-309380 A | 11/2011 |
| WO | 02/35380 A1 | 5/2002 |
| WO | WO2004010056 | 11/2004 |
| WO | 2006/028088 A1 | 3/2006 |
| WO | 2008/131042 A1 | 10/2008 |
| WO | WO2008118145 | 10/2008 |
| WO | 2009/021062 A1 | 2/2009 |

OTHER PUBLICATIONS

"Rate-Distortion Analysis for H.264/AVC Video Coding and its Application to Rate Control" Ma et al., 2005 IEEE.*

ITU_T H.264, "Advanced Video Coding for Generic Audiovisual Services", International Telecommunication union, Series H: Audiovisual and Multimedia Systems, Mar. 2005.

Cho et al., "Warped Discrete Cosine Transform and Its applicatioin in Image Compression", IEEE Transactions on Circuits and Systems for Video Technology, vol. 10, No. 8, Dec. 2000.

Ye et al., "Improved Intra Coding", ITU—Telecommunications Standardization Sector, Document: VCEG-AG11, 33rd Meeting: Shenzhen, China, Oct. 20, 2007.

Urhan et al., "Parameter Embedding Mode and Optimal Post-Process Filtering for Improved WDCT Image Compression", IEEE, Apr. 4, 2009.

Lim et al., "Integer Sine Transform for Inter Frame", ITU—Telecommunications Standardization Sector, Document: VCEG-AJ12, 36th Meeting: San Diego, CA Oct. 8-10, 2008.

Narroschke et al., "Adaptive Prediction Error Coding in Spatial and Frequency Domain with a Fixed Scan in the Spatial Domain", ITU—Telecommunications Standardization Sector, Document: VCEG-AD07, 30th Meeting: Hangzhou, China, Oct. 23-27, 2006.

Sezer et al., "Sparse Orthonormal Transforms for Image Compression", Center for Signal and Image Processing, Palo Alto, CA, Oct. 12, 2009.

Kim et al., "Rate-Distortion Optimization of the Image Compression Algorithm Based on the Warped Discrete Cosine Transform", Signal Processing, vol. 83, No. 9, Amsterdam, NL, Sep. 1, 2003, pp. 1919-1928.

Fu et al., "Directional Discrete Cosine Transforms: A Theoretical Analysis", 2007 IEEE International Conference on Acoustics, Speech, and Signal Processing, Honolulu, HI, Apr. 15-20, 2007, pp. I-1105.

Zhao et al., "Rate-Distortion Optimized Transform", ISO/IEC JTC1/SC29/WG11, MPEG2009/m16926, Xi'an, China, Oct. 2009, pp. 1-2.

Fu et al., "Diagonal Discrete Cosine Transforms for Image Coding", 2006 Lecture Notes in Computer Science, LNCS, Berlin, Germany, pp. 150-158.

Chang et al., "Direction-Adaptive Partitioned Block Transform for Image Coding", Image Processing 2008, 15th IEEE International Conference, Oct. 12, 2008, pp. 145-148.

Cho et al., An Image Compression Algorithm Using Warped Discrete Cosine Transform, 1999 IEEE, vol. 2, Oct. 24, 1999, pp. 834-837.

Richardson, H.264 and MPEG-4 Compression: Video Coding for Next-generation Multimedia. 2003 John Wiley & Sons, Ltd. ISBN: 0-470-84837-5.

Sullivan et al. "Video Compression—From Concepts to the H.264/AVC Standard," 2005 IEEE.

* cited by examiner

*Primary Examiner* — Sath V Perungavoor
*Assistant Examiner* — Nathnael Aynalem
(74) *Attorney, Agent, or Firm* — Robert D. Shedd; Ronald J. Kolczynski

(57) ABSTRACT

There are provided methods and apparatus for transform selection in video coding. An apparatus includes a video encoder for encoding at least a block in a picture by selecting a transform to apply to a residue of the block from a set of two or more available transforms. The transform is selected based on at least one of an inter prediction mode used to predict at least one reference for the block, one or more values corresponding to a motion vector, a value of a residue of one or more previously encoded blocks, a value of prediction data for the block, one or more transform selections of one or more neighboring reconstructed blocks, and a quantization step applied to transform coefficients for the residue of the block.

17 Claims, 9 Drawing Sheets

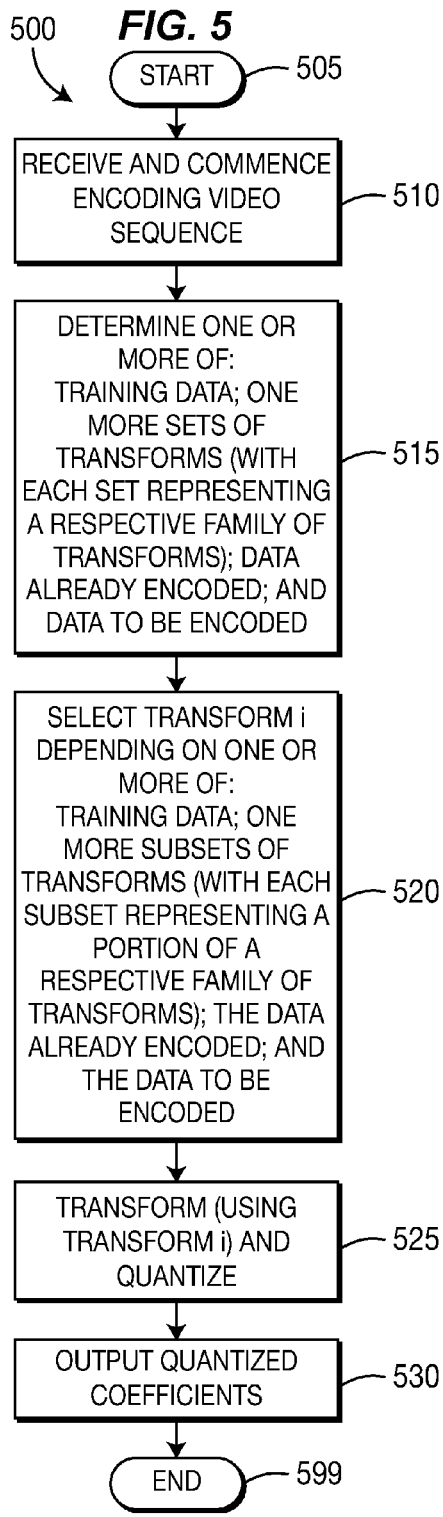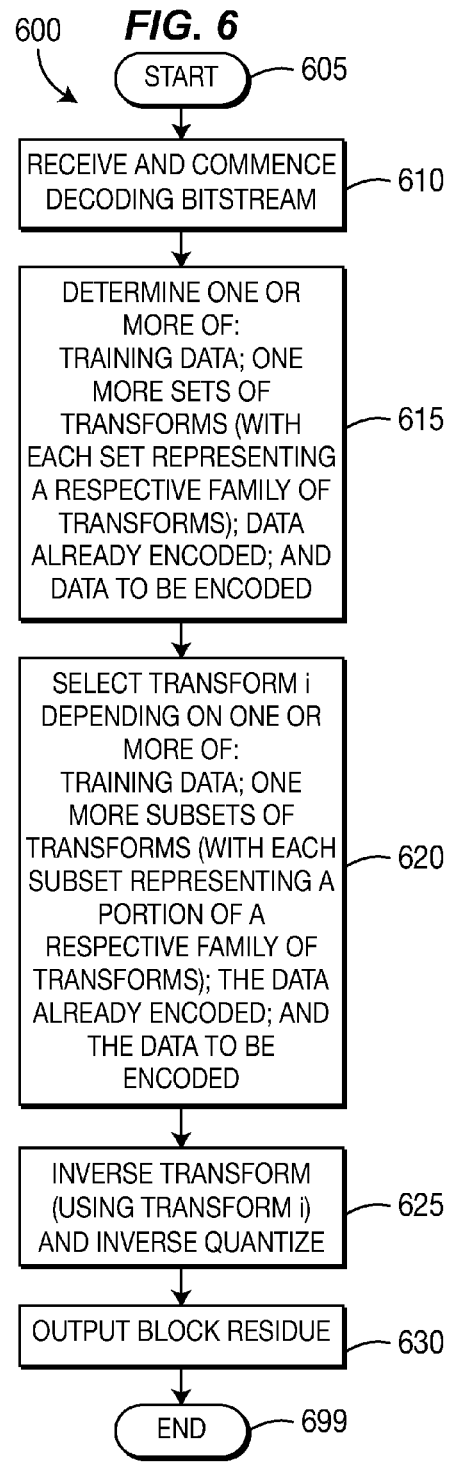

METHODS AND APPARATUS FOR TRANSFORM SELECTION IN VIDEO ENCODING AND DECODING

CROSS-REFERENCE TO RELATED APPLICATIONS

This application claims the benefit, under 35 U.S.C. §365 of International Application PCT/US2009/005730 and filed Oct. 21, 2009, which was published in accordance with PCT Article 21(2) on Aug. 5, 2010, in English, and which claims the benefit of U.S. Provisional Application Ser. No. 61/207,783, filed Feb. 17, 2009 and also claims the benefit of U.S. Provisional Application Ser. No. 61/147,705, filed Jan. 27, 2009. Furthermore, this application is also closely related in disclosed subject matter to two other applications. The first being U.S. patent application Ser. No. 13/138,088, filed Jul. 5, 2011; and the second being U.S. patent application Ser. No. 13/138,179, filed Jul. 16, 2011; each of which is incorporated by reference in their entireties; and each of which has common inventors and ownership as the instant application.

TECHNICAL FIELD

The present principles relate generally to video encoding and decoding and, more particularly, to methods and apparatus for the selection of transforms to be used for video encoding and decoding.

BACKGROUND

The block-based discrete transform is a fundamental component of many image and video compression standards and recommendations including the Joint Photographic Experts Group (JPEG) Standard, the International Telecommunication Union, Telecommunication Sector (ITU-T) H.263 Recommendation (hereinafter the "H.263 Recommendation"), the International Organization for Standardization/International Electrotechnical Commission (ISO/IEC) Moving Picture Experts Group-1 (MPEG-1) Standard, the MPEG-2 Standard, the ISO/IEC MPEG-4 Part 10 Advanced Video Coding (AVC) Standard/ITU-T H.264 Recommendation (hereinafter the "MPEG-4 AVC Standard"), and others, and it is used in a wide range of applications.

The discrete cosine transform (DCT) is the most extensively used block transform. The DCT scheme takes advantage of the local spatial correlation property of the image/frame by dividing the image/frame into blocks of pixels (usually 4×4 and 8×8), transforming each block from the spatial domain to the frequency domain using the discrete cosine transform, and quantizing the DCT coefficients. Most image and video compression standards use a fixed two-dimensional (2-D) separable DCT block transform. If several block sizes are allowed (typically, from 4×4 to 16×16 blocks), then they use a DCT having a size corresponding to the block. Nonetheless, there is only one possible transform for each block size.

However, the image and video content has data with varying statistics and properties. Thus, the availability of, and hence forced use of, a single transform per block size fails to realize any potential compression gains that could be available using a different transform than the single transform available per block size.

In the image and video coding standards such as, for example, the MPEG-4 AVC Standard, there is only one choice for the block transform to use for each block size. There is no selection of the transform.

Turning to FIG. 1, a video encoder capable of performing video encoding in accordance with the MPEG-4 AVC Standard is indicated generally by the reference numeral 100. The video encoder 100 includes a frame ordering buffer 110 having an output in signal communication with a non-inverting input of a combiner 185. An output of the combiner 185 is connected in signal communication with a first input of a transformer and quantizer 125. An output of the transformer and quantizer 125 is connected in signal communication with a first input of an entropy coder 145 and a first input of an inverse transformer and inverse quantizer 150. An output of the entropy coder 145 is connected in signal communication with a first non-inverting input of a combiner 190. An output of the combiner 190 is connected in signal communication with a first input of an output buffer 135.

A first output of an encoder controller 105 is connected in signal communication with a second input of the frame ordering buffer 110, a second input of the inverse transformer and inverse quantizer 150, an input of a picture-type decision module 115, a first input of a macroblock-type (MB-type) decision module 120, a second input of an intra prediction module 160, a second input of a deblocking filter 165, a first input of a motion compensator 170, a first input of a motion estimator 175, and a second input of a reference picture buffer 180.

A second output of the encoder controller 105 is connected in signal communication with a first input of a Supplemental Enhancement Information (SEI) inserter 130, a second input of the transformer and quantizer 125, a second input of the entropy coder 145, a second input of the output buffer 135, and an input of the Sequence Parameter Set (SPS) and Picture Parameter Set (PPS) inserter 140.

An output of the SEI inserter 130 is connected in signal communication with a second non-inverting input of the combiner 190.

A first output of the picture-type decision module 115 is connected in signal communication with a third input of the frame ordering buffer 110. A second output of the picture-type decision module 115 is connected in signal communication with a second input of a macroblock-type decision module 120.

An output of the Sequence Parameter Set (SPS) and Picture Parameter Set (PPS) inserter 140 is connected in signal communication with a third non-inverting input of the combiner 190.

An output of the inverse quantizer and inverse transformer 150 is connected in signal communication with a first non-inverting input of a combiner 119. An output of the combiner 119 is connected in signal communication with a first input of the intra prediction module 160 and a first input of the deblocking filter 165. An output of the deblocking filter 165 is connected in signal communication with a first input of a reference picture buffer 180. An output of the reference picture buffer 180 is connected in signal communication with a second input of the motion estimator 175 and a third input of the motion compensator 170. A first output of the motion estimator 175 is connected in signal communication with a second input of the motion compensator 170. A second output of the motion estimator 175 is connected in signal communication with a third input of the entropy coder 145.

An output of the motion compensator 170 is connected in signal communication with a first input of a switch 197. An output of the intra prediction module 160 is connected in signal communication with a second input of the switch 197. An output of the macroblock-type decision module 120 is connected in signal communication with a third input of the switch 197. The third input of the switch 197 determines whether or not the "data" input of the switch (as compared to the control input, i.e., the third input) is to be provided by the motion compensator 170 or the intra prediction module 160. The output of the switch 197 is connected in signal communication with a second non-inverting input of the combiner 119 and an inverting input of the combiner 185.

A first input of the frame ordering buffer 110 and an input of the encoder controller 105 are available as inputs of the encoder 100, for receiving an input picture. Moreover, a second input of the Supplemental Enhancement Information (SEI) inserter 130 is available as an input of the encoder 100, for receiving metadata. An output of the output buffer 135 is available as an output of the encoder 100, for outputting a bitstream.

Turning to FIG. 2, a video decoder capable of performing video decoding in accordance with the MPEG-4 AVC Standard is indicated generally by the reference numeral 200. The video decoder 200 includes an input buffer 210 having an output connected in signal communication with a first input of the entropy decoder 245. A first output of the entropy decoder 245 is connected in signal communication with a first input of an inverse transformer and inverse quantizer 250. An output of the inverse transformer and inverse quantizer 250 is connected in signal communication with a second non-inverting input of a combiner 225. An output of the combiner 225 is connected in signal communication with a second input of a deblocking filter 265 and a first input of an intra prediction module 260. A second output of the deblocking filter 265 is connected in signal communication with a first input of a reference picture buffer 280. An output of the reference picture buffer 280 is connected in signal communication with a second input of a motion compensator 270.

A second output of the entropy decoder 245 is connected in signal communication with a third input of the motion compensator 270 and a first input of the deblocking filter 265. A third output of the entropy decoder 245 is connected in signal communication with an input of a decoder controller 205. A first output of the decoder controller 205 is connected in signal communication with a second input of the entropy decoder 245. A second output of the decoder controller 205 is connected in signal communication with a second input of the inverse transformer and inverse quantizer 250. A third output of the decoder controller 205 is connected in signal communication with a third input of the deblocking filter 265. A fourth output of the decoder controller 205 is connected in signal communication with a second input of the intra prediction module 260, a first input of the motion compensator 270, and a second input of the reference picture buffer 280.

An output of the motion compensator 270 is connected in signal communication with a first input of a switch 297. An output of the intra prediction module 260 is connected in signal communication with a second input of the switch 297. An output of the switch 297 is connected in signal communication with a first non-inverting input of the combiner 225.

An input of the input buffer 210 is available as an input of the decoder 200, for receiving an input bitstream. A first output of the deblocking filter 265 is available as an output of the decoder 200, for outputting an output picture.

There have been some prior proposals for the use of multiple transforms in a single coding scheme. In a first prior art approach, an optimal linear transform is disclosed, which is referred to as the Karhunen Loeve Transform (KLT). KLT is employed to derive the best transform for each of the 9 intra prediction modes in the MPEG-4 AVC Standard. The statistics for each mode are extracted and the corresponding KLTs are derived. Each intra prediction residual is encoded with its KLT. The 9 intra modes partition the data space effectively, in such a way that the DCT is no longer close to the best transform, so a distinctive best transform can be derived and successfully applied. In sum, the proposal uses several transforms, but each of them is fixed to the intra prediction mode selected.

A second prior art approach proposes to modify the DCT transform to several frequencies, that is, changing the basis functions with different all-pass filters to attain a variety of warped frequency responses. The resulting transforms are called warped DCT (WDCT). An exhaustive rate distortion (R-D) search is performed for each block and the selected transform is indicated with side information. The idea is applied to image compression.

A third prior art approach describes using the WDCT and embedding the transform selection within the transformed coefficients themselves. The method shows good performance for low-bit rate image compression. Also, the method adds a post-filtering step that minimizes the mean square error (MSE). The filter is determined at the encoder and multiplexed into the bit-stream.

A fourth prior art approach proposes an algebraic optimization of a set of transforms for a large database. The set is partitioned iteratively until it reaches a stable point in which each transform is sparse-optimal for its particular subset of data. The coder indicates through a quad-tree which transform is used in each block. Thus, the transform choice is not done independently for each block.

A fifth prior art approach proposes an integer sine transform (IST) for inter frame mode. An inter frame residue has a low correlation, and the DCT is adequate only for highly correlated data. Therefore, it proposes a sine transform, which is efficient for data with a correlation from −0.5 to 0.5. The KLT coincides with the sine transform in part of this range. The IST is derived from the sine transform in exactly the same way as the integer cosine transform in the MPEG-4 AVC Standard. The fifth prior art approach has implemented the 4×4 and 8×8 IST versions. The same transform is applied for the whole macroblock, sending a flag, unless the macroblock is divided into 4 sub-macroblocks, then 4 flags are sent specifying the transform employed in each sub-macroblock.

A sixth prior art approach proposes a scheme similar to that proposed in the fifth prior art approach. The sixth prior art approach proposes an adaptive prediction error coding (APEC) scheme that enables adaptive prediction error coding in the spatial and frequency domain. For each block of the prediction error, either transform coding or spatial domain coding is applied. The algorithm with a lower rate-distortion cost is chosen.

The preceding approaches propose a limited range of choice of the best transform and do not fully exploit the available possibilities.

SUMMARY

These and other drawbacks and disadvantages of the prior art are addressed by the present principles, which are directed to methods and apparatus for transform selection in video coding.

According to an aspect of the present principles, there is provided an apparatus. The apparatus includes a video encoder for encoding at least a block in a picture by selecting a transform to apply to a residue of the block from a set of two or more available transforms. The transform is selected based on at least one of an inter prediction mode used to predict at least one reference for the block, one or more values corresponding to a motion vector, a value of a residue of one or more previously encoded blocks, a value of prediction data for the block, one or more transform selections of one or more neighboring reconstructed blocks, and a quantization step applied to transform coefficients for the residue of the block.

According to another aspect of the present principles, there is provided an apparatus. The apparatus includes a video encoder for encoding at least a block in a picture by selecting a transform to apply to a residue of the block from a set of two or more available transforms. The video encoder sends information describing the selected transform by at least one of sending the information explicitly using one or more flags, sending the information using a tree structure in a bitstream, embedding the information within transform coefficients corresponding to the selected transform, and allowing a corresponding decoder to infer the selected transform from already decoded data.

According to yet another aspect of the present principles, there is provided an apparatus. The apparatus includes a video encoder for encoding at least a block in a picture in a video sequence by selecting a transform to apply to a residue of the block from a set of two or more available transforms. The set of transforms is at least one of determined and refined using reconstructed data from one or more previous pictures in the video sequence.

According to still another aspect of the present principles, there is provided an apparatus. The apparatus includes a video encoder for encoding at least a block in a picture by selecting a transform to apply to a residue of the block from a set of two or more available transforms. The set of transforms is determined from data to be encoded for the block.

According to a further aspect of the present principles, there is provided a method in a video encoder. The method includes encoding at least a block in a picture by selecting a transform to apply to a residue of the block from a set of two or more available transforms. The transform is selected based on at least one of an inter prediction mode used to predict at least one reference for the block, one or more values corresponding to a motion vector, a value of a residue of one or more previously encoded blocks, a value of prediction data for the block, one or more transform selections of one or more neighboring reconstructed blocks, and a quantization step applied to transform coefficients for the residue of the block.

According to a still further aspect of the present principles, there is provided a method in a video encoder. The method includes encoding at least a block in a picture by selecting a transform to apply to a residue of the block from a set of two or more available transforms; and sending information describing the selected transform by at least one of sending the information explicitly using one or more flags, sending the information using a tree structure in a bitstream, embedding the information within transform coefficients corresponding to the selected transform, and allowing a corresponding decoder to infer the selected transform from already decoded data.

According to a yet further aspect of the present principles, there is provided a method in a video encoder. The method includes encoding at least a block in a picture in a video sequence by selecting a transform to apply to a residue of the block from a set of two or more available transforms. The set of transforms is at least one of determined and refined using reconstructed data from one or more previous pictures in the video sequence.

According to an additional aspect of the present principles, there is provided a method in a video encoder. The method includes determining a set of one or more transforms; and encoding at least a block in a picture by selecting a transform to apply to a residue of the block from the set of transforms. The set of transforms is determined from data to be encoded for the block.

These and other aspects, features and advantages of the present principles will become apparent from the following detailed description of exemplary embodiments, which is to be read in connection with the accompanying drawings.

BRIEF DESCRIPTION OF THE DRAWINGS

The present principles may be better understood in accordance with the following exemplary figures, in which:

FIG. 5 is a flow diagram showing an exemplary method for transform selection in a video encoder, in accordance with an embodiment of the present principles;

FIG. 6 is a flow diagram showing an exemplary method for transform selection in a video decoder, in accordance with an embodiment of the present principles;

DETAILED DESCRIPTION

Figure 1:
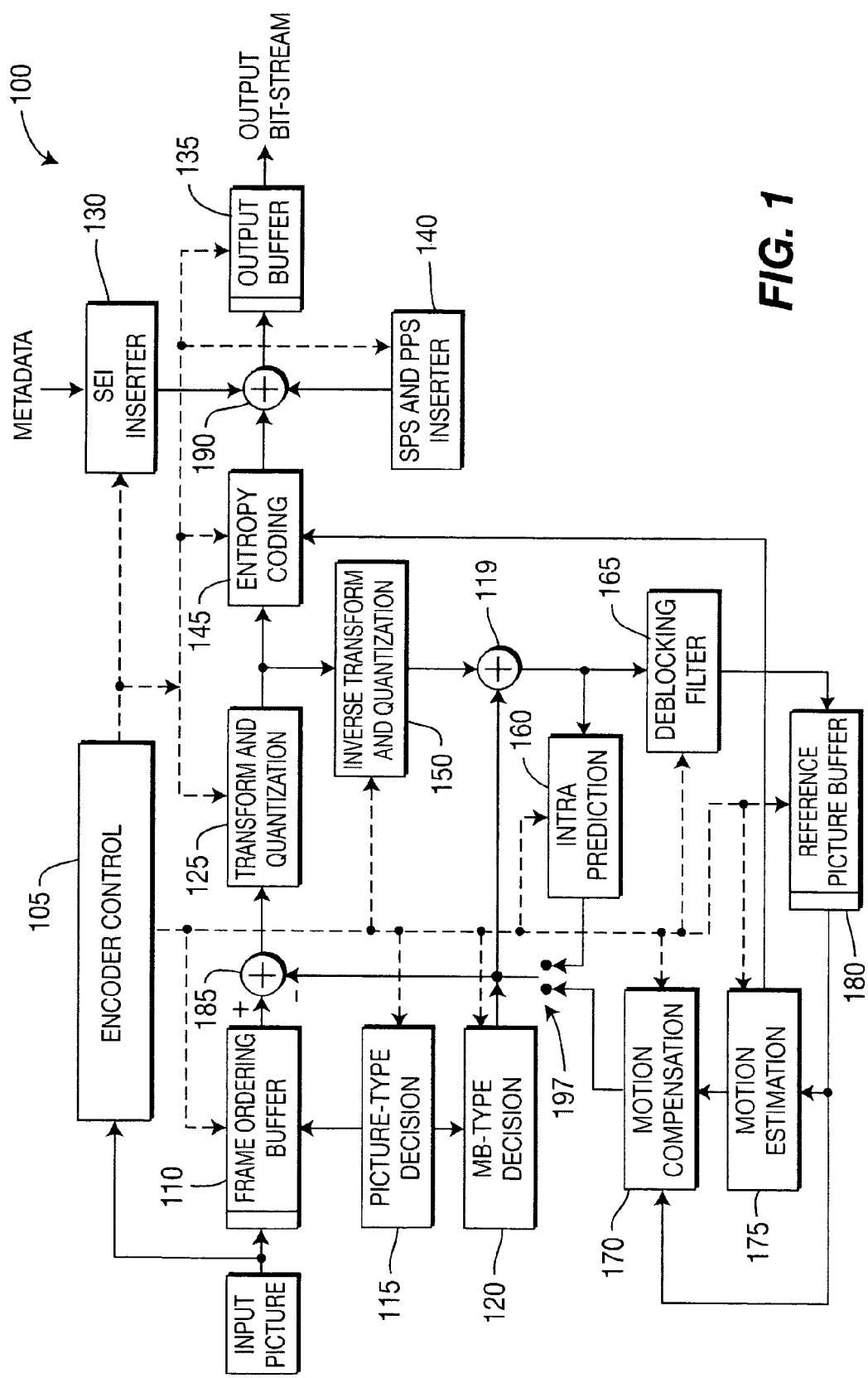
FIG. 1 is a block diagram showing a video encoder capable of performing video encoding in accordance with the MPEG-4 AVC Standard.
Figure 2:
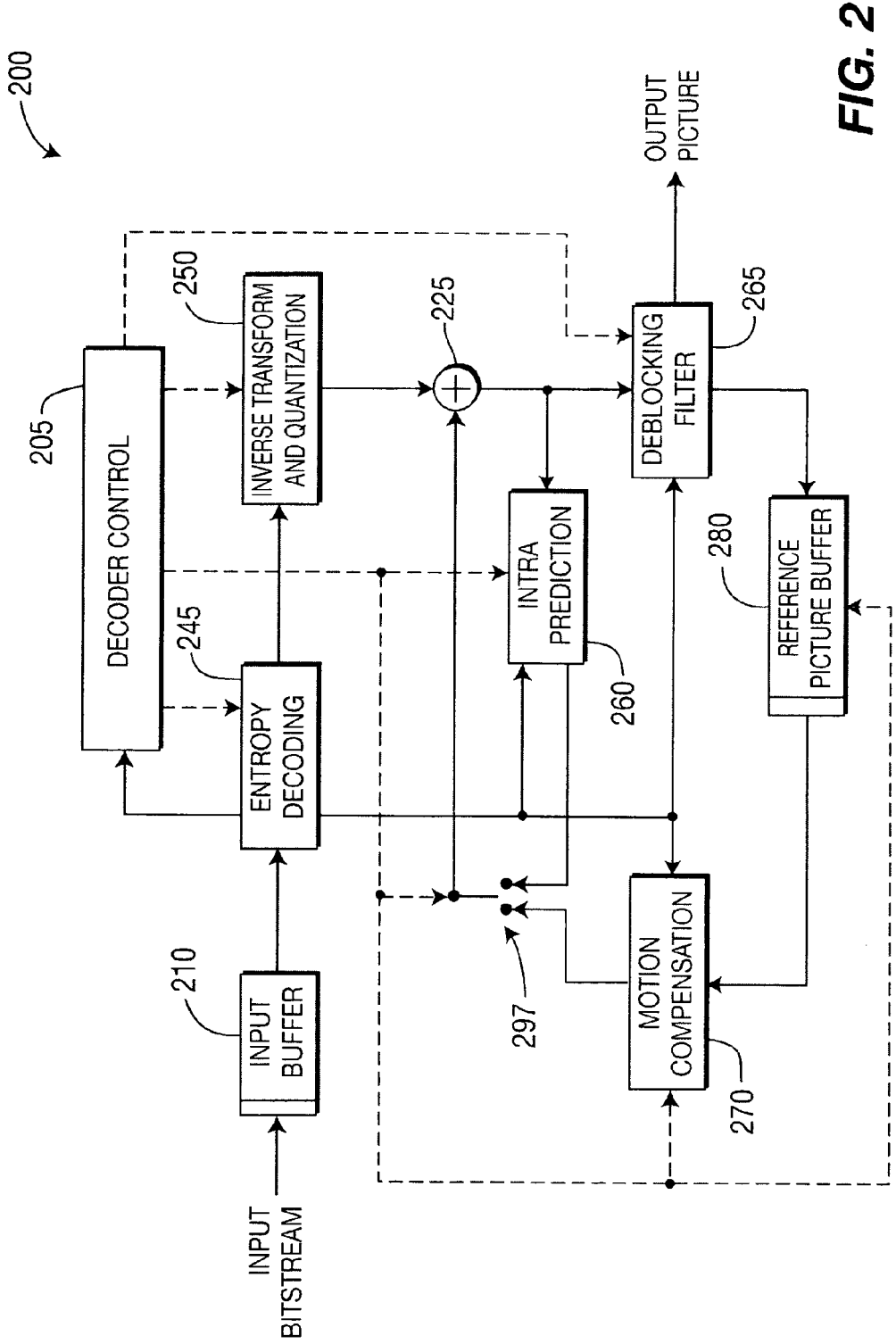
FIG. 2 is a block diagram showing a video decoder capable of performing video decoding in accordance with the MPEG-4 AVC Standard.

The present principles are directed to methods and apparatus for transform selection in video coding.

The present description illustrates the present principles. It will thus be appreciated that those skilled in the art will be able to devise various arrangements that, although not explicitly described or shown herein, embody the present principles and are included within its spirit and scope.

All examples and conditional language recited herein are intended for pedagogical purposes to aid the reader in understanding the present principles and the concepts contributed by the inventor(s) to furthering the art, and are to be construed as being without limitation to such specifically recited examples and conditions.

Moreover, all statements herein reciting principles, aspects, and embodiments of the present principles, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the present principles. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read-only memory ("ROM") for storing software, random access memory ("RAM"), and non-volatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified function is intended to encompass any way of performing that function including, for example, a) a combination of circuit elements that performs that function or b) software in any form, including, therefore, firmware, microcode or the like, combined with appropriate circuitry for executing that software to perform the function. The present principles as defined by such claims reside in the fact that the functionalities provided by the various recited means are combined and brought together in the manner which the claims call for. It is thus regarded that any means that can provide those functionalities are equivalent to those shown herein.

Reference in the specification to "one embodiment" or "an embodiment" of the present principles, as well as other variations thereof, means that a particular feature, structure, characteristic, and so forth described in connection with the embodiment is included in at least one embodiment of the present principles. Thus, the appearances of the phrase "in one embodiment" or "in an embodiment", as well any other variations, appearing in various places throughout the specification are not necessarily all referring to the same embodiment. Moreover, it is to be noted that the phrases "embodiment" and "implementation" are used interchangeably herein.

Moreover, as used herein, the words "picture" and "image" are used interchangeably and refer to a still image or a picture from a video sequence. As is known, a picture may be a frame or a field.

Further, as used herein, the word "block" refers to a block of any block size, including a super macroblock, a macroblock, a macroblock partition, and a sub-macroblock partition.

Also, as used herein, the word "refinement" with respect to a set of transforms or a transform refers to information required to derive a transform/set of transforms from a reference transforms/set of transforms. Usually, it is more efficient to send the information of the "difference" (refinement) of a transform/set of transforms than to send all the information required to derive the transform/set of transforms from scratch.

Additionally, as used herein, the phrase "side information" refers to additional information that has to be included in the bitstream to convey to the decoder additional data that is not found in the usual bitstream. For instance, if two transforms may be used to encode a block, the selected transform has to be signaled so the decoder knows what inverse transform to use. Therefore, the encoder could include 1 bit of 'side information' indicating what inverse transform is to be used.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Moreover, it is to be appreciated that while one or more embodiments of the present principles are described herein as advancements over (and with reference to) the MPEG-4 AVC standard, the present principles are not so limited and, thus, may be utilized with respect to other video coding standards, recommendations, and extensions thereof, including extensions of the MPEG-4 AVC standard, while maintaining the spirit of the present principles.

As noted above, the present principles are directed to methods and apparatus for transform selection in video coding. Recognizing that image and video content has data with varying statistics and properties, we also recognize that there are potential compression gains to be realized if several transforms could be used for each block, selecting for each situation the most favorable transform within a range of options. In at least one embodiment, we propose to optimize/design a set of transforms to given statistics or patterns and select from the set the best transform for each region or block.

Thus, we propose a more general and broader approach that includes alternatives not considered in the prior art. In accordance with the present principles, we describe using a set of transforms (two or more transforms) and then encode an image or video choosing the best transform of the set for each region, slice, block or macroblock. The set of transforms may be optimized or designed for a range of statistics or image/video patterns. The present principles also involve how to choose the best transform and the proper signaling of the selected transform, so that the image/video decoder can recover the choice information efficiently.

There is no need to restrict the video encoder and decoder to have only one possible transform. In an embodiment, we propose that the video encoder can choose from among different transforms for each block, macroblock, or region to achieve the best performance. Then, in an embodiment, we combine the set of transforms in the encoder with a light syntax that does not damage the potential gains.

Figure 3:
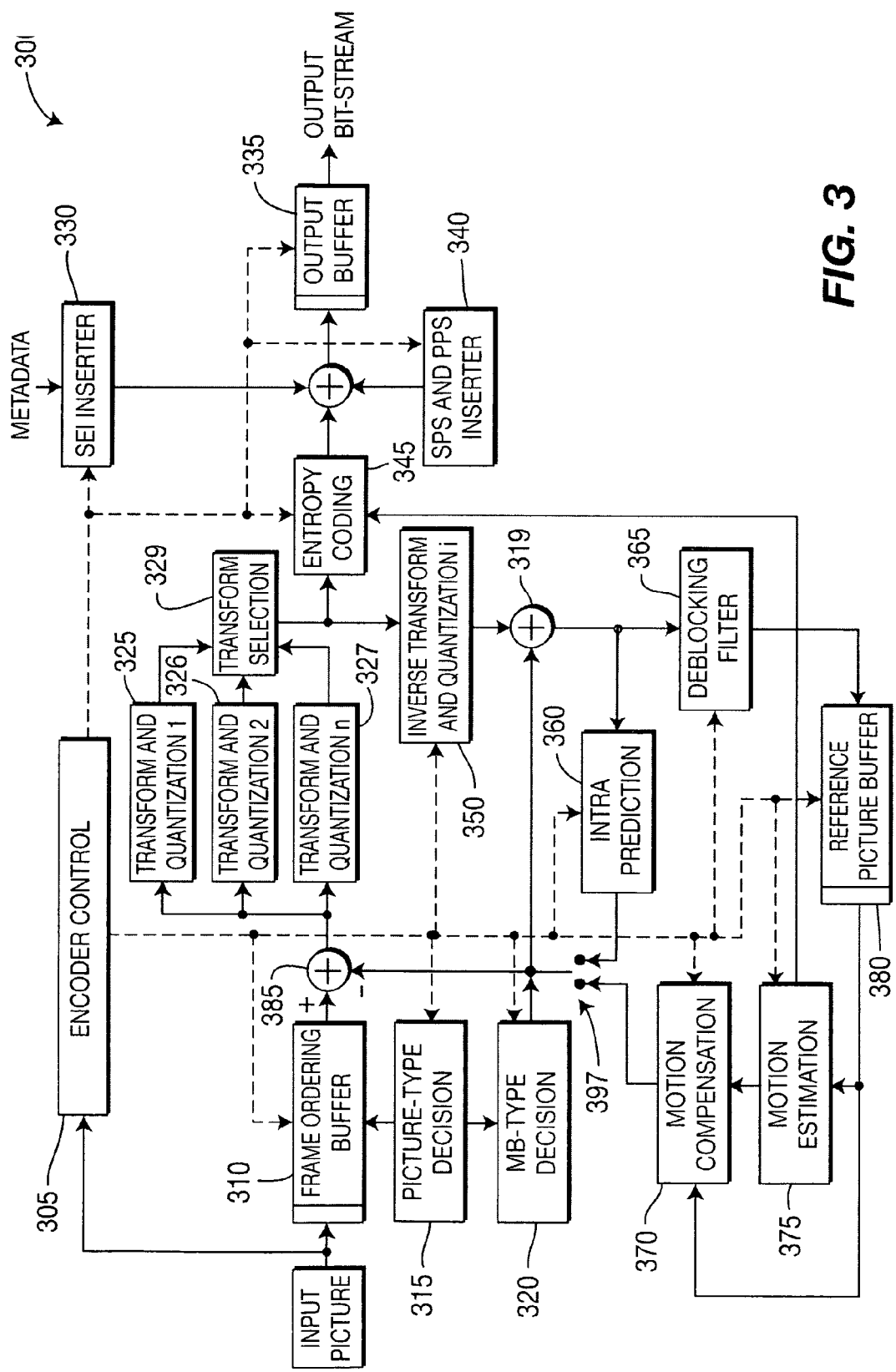
FIG. 3 is a block diagram showing an exemplary video encoder with transform selection to which the present principles may be applied, in accordance with an embodiment of the present principles.

Turning to FIG. 3, an exemplary video encoder with transform selection is indicated generally by the reference numeral 300. The video encoder 300 includes a frame ordering buffer 310 having an output in signal communication with a non-inverting input of a combiner 385. An output of the combiner 385 is connected in signal communication with an input of a transformer and quantizer 1 325, an input of a transformer and quantizer 2 326, and an input of a transformer and quantizer n 327. An output of the transformer and quantizer 1 325 is connected in signal communication with a first input of a transform selector 329. An output of the transformer and quantizer 2 326 is connected in signal communication with a second input of the transform selector 329. An output of the transformer and quantizer n 327 is connected in signal communication with a third input of the transform selector 329. An output of the transform selector 329 is connected in signal communication with a first input of an entropy coder 345 and a first input of an inverse transformer and inverse quantizer 350. An output of the entropy coder 345 is connected in signal communication with a first non-inverting input of a combiner 390. An output of the combiner 390 is connected in signal communication with a first input of an output buffer 335.

A first output of an encoder controller 305 is connected in signal communication with a second input of the frame ordering buffer 310, a second input of the inverse transformer and inverse quantizer 350, an input of a picture-type decision module 315, a first input of a macroblock-type (MB-type) decision module 320, a second input of an intra prediction module 360, a second input of a deblocking filter 365, a first input of a motion compensator 370, a first input of a motion estimator 375, and a second input of a reference picture buffer 380.

A second output of the encoder controller 305 is connected in signal communication with a first input of a Supplemental Enhancement Information (SEI) inserter 330, a second input of the entropy coder 345, a second input of the output buffer 335, and an input of the Sequence Parameter Set (SPS) and Picture Parameter Set (PPS) inserter 340.

An output of the SEI inserter 330 is connected in signal communication with a second non-inverting input of the combiner 390.

A first output of the picture-type decision module 315 is connected in signal communication with a third input of the frame ordering buffer 310. A second output of the picture-type decision module 315 is connected in signal communication with a second input of a macroblock-type decision module 320.

An output of the Sequence Parameter Set (SPS) and Picture Parameter Set (PPS) inserter 340 is connected in signal communication with a third non-inverting input of the combiner 390.

An output of the inverse quantizer and inverse transformer 350 is connected in signal communication with a first non-inverting input of a combiner 319. An output of the combiner 319 is connected in signal communication with a first input of the intra prediction module 360 and a first input of the deblocking filter 365. An output of the deblocking filter 365 is connected in signal communication with a first input of a reference picture buffer 380. An output of the reference picture buffer 380 is connected in signal communication with a second input of the motion estimator 375 and a third input of the motion compensator 370. A first output of the motion estimator 375 is connected in signal communication with a second input of the motion compensator 370. A second output of the motion estimator 375 is connected in signal communication with a third input of the entropy coder 345.

An output of the motion compensator 370 is connected in signal communication with a first input of a switch 397. An output of the intra prediction module 360 is connected in signal communication with a second input of the switch 397. An output of the macroblock-type decision module 320 is connected in signal communication with a third input of the switch 397. The third input of the switch 397 determines whether or not the "data" input of the switch (as compared to the control input, i.e., the third input) is to be provided by the motion compensator 370 or the intra prediction module 360. The output of the switch 397 is connected in signal communication with a second non-inverting input of the combiner 319 and an inverting input of the combiner 385.

A first input of the frame ordering buffer 310 and an input of the encoder controller 305 are available as inputs of the encoder 300, for receiving an input picture. Moreover, a second input of the Supplemental Enhancement Information (SEI) inserter 330 is available as an input of the encoder 300, for receiving metadata. An output of the output buffer 335 is available as an output of the encoder 300, for outputting a bitstream.

In an embodiment, the video encoder 300 selects the best transform from a set of n transforms and sends the side information of the selected transform. Then, the inverse transform is performed for the selected transform (denoted by i). In this embodiment, the transforms are derived offline and available at the encoder and decoder. In an embodiment, the entropy coding performed by the entropy coder 345 is changed/modified to accommodate the additional information of what transform is being used, and also because each transform may require different entropy coding (different scanning order, different contexts, and so forth).

Figure 4:
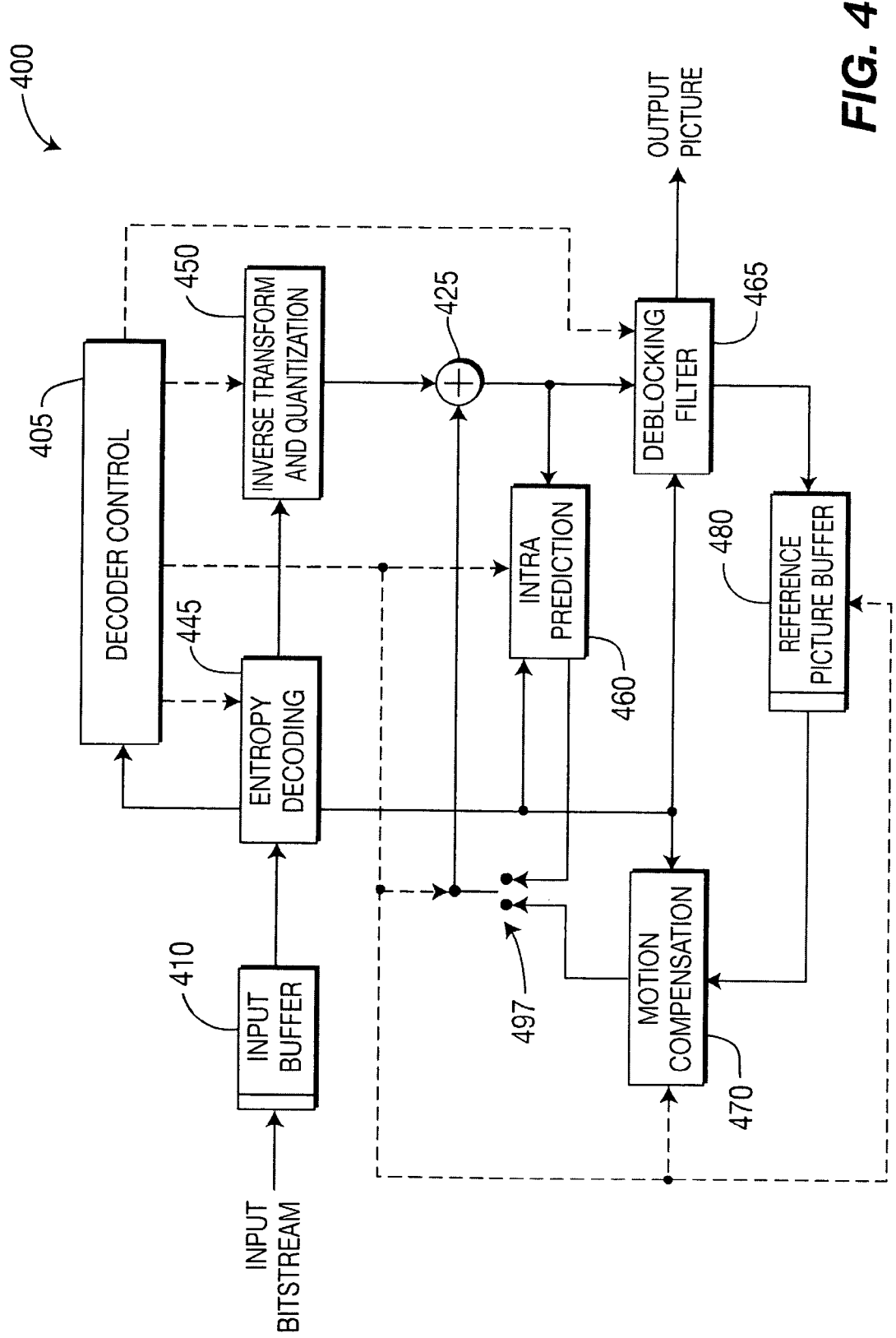
FIG. 4 is a block diagram showing an exemplary video decoder with transform selection to which the present principles may be applied, in accordance with an embodiment of the present principles.

Turning to FIG. 4, an exemplary video decoder with transform selection is indicated generally by the reference numeral 400. The video decoder 400 includes an input buffer 410 having an output connected in signal communication with a first input of the entropy decoder 445. A first output of the entropy decoder 445 is connected in signal communication with a first input of an inverse transformer and inverse quantizer i 450. An output of the inverse transformer and inverse quantizer i 450 is connected in signal communication with a second non-inverting input of a combiner 425. An output of the combiner 425 is connected in signal communication with a second input of a deblocking filter 465 and a first input of an intra prediction module 460. A second output of the deblocking filter 465 is connected in signal communication with a first input of a reference picture buffer 480. An output of the reference picture buffer 480 is connected in signal communication with a second input of a motion compensator 470.

A second output of the entropy decoder 445 is connected in signal communication with a third input of the motion compensator 470 and a first input of the deblocking filter 465. A third output of the entropy decoder 445 is connected in signal communication with an input of a decoder controller 405. A first output of the decoder controller 405 is connected in signal communication with a second input of the entropy decoder 445. A second output of the decoder controller 405 is connected in signal communication with a second input of the inverse transformer and inverse quantizer i 450. A third output of the decoder controller 405 is connected in signal communication with a third input of the deblocking filter 465. A fourth output of the decoder controller 405 is connected in signal communication with a second input of the intra prediction module 460, a first input of the motion compensator 470, and a second input of the reference picture buffer 480.

An output of the motion compensator 470 is connected in signal communication with a first input of a switch 497. An output of the intra prediction module 460 is connected in signal communication with a second input of the switch 497. An output of the switch 497 is connected in signal communication with a first non-inverting input of the combiner 425.

An input of the input buffer 410 is available as an input of the decoder 400, for receiving an input bitstream. A first output of the deblocking filter 465 is available as an output of the decoder 400, for outputting an output picture.

Techniques exist to derive an optimal set of transforms when the data to be encoded is available or there is an adequate training data set. For instance, a training set of several sequences can be available and these techniques can provide a set of transforms that partition the data space such that each transform is the best for its part of the data. Then, given a block, the encoder has to determine the type of data the block belongs to and use the adequate transform. These techniques to derive a set of transforms can be based on the common KLT, on a sparsity objective function, and/or techniques as known or readily derived by those of ordinary skill in this and related arts. Presuming that we have such techniques available, we now address how to use the set of transforms in an efficient way, that is, how to select the best transform and how to convey information from the encoder to the decoder efficiently.

Determining the Set of Transforms

We now explain how to determine the set of transforms that are used.

In one embodiment, the set of transforms is derived offline employing a set of sequences as a training data. As mentioned, KLT-based, sparsity-based, energy-compaction or other methods can be used to derive the set of transforms once a good training set is established.

There are methods to derive transforms based on a priori design criterion (directionality, frequency, etc) on the set of transforms. Also, the fourth prior art approach mentioned above proposes an off-line optimization based on training data with an algebraic optimization process. The process is driven by a cost function aiming to obtain a suited set of transforms for the given data. The cost function consists of two terms consistent with compression purposes. The algorithm attempts to minimize a reconstruction error term, while maximizing a term related to the sparsity of the transform coefficients representation. In principle, more sparsity means less bit-rate to convey the coefficients' information. We also propose an approach that solves at least two deficiencies of the above referenced prior art approach. First, we explicitly provide a weight to balance both terms of the cost function. Second and more important, we propose to derive optimal vertical and horizontal transforms instead of single 2-D non-separable transforms. While our approach couples the joint optimization of both directions, the advantages are important for practical applications in that the computational complexity and memory requirements for a set of separable transforms are much lower than the requirements for a set of non-separable transforms. At the same time, allowing the transforms in the vertical and horizontal directions to be different permits the capture of the richness of image and video blocks better than having a single kernel for both directions.

Note that when we say 'set of transforms' each of these transforms may be non-separable or separable. If they are separable, each direction (vertical/horizontal) may be equal or different.

In another embodiment, a subset of a family of transforms can be selected, so that the subset has good properties in order to encode the input data. As an example, a subset of the WDCT could be determined for the video data to encode. Also, a subset of the lapped transforms could be determined. Once the subset is fixed, the encoder only needs to convey the information of what transform within the family subset is used.

In another embodiment, the subset of transforms is selected according to the quality of the reconstructed video. The quality of the output can be determined by the quantization step of the encoder, the quantization parameter (QP), the goal bit-rate, the PSNR, and/or any parameter of metric that indicates the desired output video quality.

In another embodiment, the set of transforms is derived online from the data already being encoded. Two exemplary implementations of this embodiment are provided as follows. In one exemplary implementation, reconstructed data of previous frames is used as a training set to derive the set of transforms with any of the available methods. In another exemplary implementation, reconstructed data is used to refine the transform that is being used, so that the transform is updated online to match the ongoing data statistics.

In another embodiment, the set of transforms is derived from the data to be encoded. Such data to be encoded includes, but is not limited to, the original frame or statistics drawn from the next frames to encode. Therefore, the encoder analyzes the sequence or the next part of the sequence to encode and determines with any of the available methods the best set of transforms to use or selects the best family of transforms to use. In this case, the encoder needs to send as side information the set of transforms that are going to be used. Several exemplary implementation of this embodiment are provided as follows. In a first exemplary implementation, the encoder finds the best set of transforms and sends all the transforms to use. In a second exemplary embodiment, the encoder finds the best set of transforms to use, and the decoder tries to deduce the best set from previous decoded data, so that the encoder only needs to send a refinement of the transform deducted by the decoder (so that there is no error or mismatch between the encoder and decoder). In a third exemplary implementation, the encoder selects from a variety of sets of transforms (available at both the encoder and decoder) the best set to use, and signals the particular set to the decoder. In a fourth implementation, the encoder finds the particular set of transforms from a family of transforms that is best suited for the data. Then, the encoder conveys to the decoder the particular subset of the family of transforms that has been selected.

Conveying the Selected Transform

We now describe how to indicate the selected transform to the decoder so that the encoder and decoder match.

In one embodiment, the encoder can send the selected transform to the decoder with a flag included in the syntax at the slice, macroblock, or block level. In one embodiment, at the encoder, the best transform for each block is determined with a rate-distortion cost function.

In another embodiment, the selected transform can be conveyed with a quad-tree or other types of trees that allow specifying explicitly and flexibly the selected transform for different regions in the frame. In this way, the region of a transform can be more arbitrary than the simple block shape of the previous embodiment.

In another embodiment, the selected transform can be sent by hiding the flag (that indicates which transform is to be used) within the transforms coefficients themselves. A possible embodiment of this alternative is explained in the following. Presume that there are only two transforms in the set of transforms. Then, if transform 1 is selected, then the encoder enforces the sum of the transform coefficients to be even. If transform 2 is selected, then the encoder enforces the sum of the transform coefficients to be odd. At the decoder, the transform coefficients are recovered and the parity of their sum computed. If the parity is even, then the inverse transform to apply is that of transform 1. If the parity is odd, then the inverse transform to apply is that of transform 2. In this way, the flag can be hidden in the transform coefficients and it is recoverable at the decoder side so both the encoder and decoder are in synchrony. Obviously, hiding the flag in the coefficients is not limited to having two transforms. Such technique can be straightforward extended to any number of transforms.

In another embodiment, the explicit information of the selected transform is not sent. In this case, it can be deduced from the data already decoded. This information has to be available at both the encoder and decoder and the way to extract the selected transform from the data has to be the same in both so they are in synchrony. There is a variety of information from which the transform can be selected. In the following, 5 particular embodiments of this implicit signaling are provided. Of course, the present principles are not limited to the following embodiments relating to implicit signaling and, given the teachings of the present principles provided herein, one of ordinary skill in this and related arts will contemplate these and other implementations, while maintaining the spirit of the present principles.

In a first embodiment, the inter prediction mode employed is used to implicitly signal the transform(s). In one implementation of this embodiment, if it is a direct mode, transform 1 is used. Otherwise, transform 2 is used.

In a second embodiment, the motion vector is used to implicitly signal the transform(s). The transform to be used can depend on the motion vector of the block (its size, direction, reference picture, and so forth).

In a third embodiment, the transform depends on the residue of previous encoded blocks. Then, the statistics of the residue of the previous encoded blocks determines what transform within the set is used.

In a fourth embodiment, the transform choice depends on the predicted data for the block. There is some correlation between the residue and the predicted data that can be exploited in the choice of the best transform. As an example, if the prediction has a directional component, then this directionality is usually also evident in the residue. Then, the use of a directional transform for that given direction gives a better performance because directional transforms can take advantage of the directional component of the residue in a way that non-directional transforms can not.

In a fifth embodiment, the transform choice can be dependent on the transform selections of the neighboring reconstructed blocks, which are available at both the encoder and decoder.

The System

The present principles may be considered to involve two parts, namely how to select the set of transforms and how to convey the selected transform within the set for each particular block. Several alternatives are proposed for each of these two parts. The proposed approaches can combine any of the proposed alternatives for each of the parts. Also, note that each transform may need its particular quantization process, as well as a different scanning order of the coefficients prior to entropy encoding. Also, each scanning order may be done adaptive to the statistics of each transform. In one embodiment, the scanning order of each transform can be adaptive to the number of times a particular coefficient position has been previously encoded as significant. The present principles consider the following extensions of the transform: quantization process of the transform; scanning order of the transform; and potential adaptivity of this scanning order.

Turning to FIG. 5, an exemplary method for transform selection in a video encoder is indicated generally by the reference numeral 500. The method 500 includes a start block 505 that passes control to a function block 510. The function block 510 receives a video sequence for encoding, commences encoding the video sequence, and passes control to a function block 515. The function block 515 determines one or more of training data, one or more sets of transforms with each set representing a respective family of transforms, data already encoded, and data to be encoded, and passes control to a function block 520. The function block 520 selects a transform i depending on one or more of the training data, one or more subsets of transforms with each subset representing a respective portion of a family of transforms, the data already encoded, and the data to be encoded, and passes control to a function block 525. The function block 525 transforms using selected transform i and quantizes block residue data for a block in a picture of the video sequence, and passes control to a function block 530. The function block 530 outputs quantized coefficients, and passes control to an end block 599.

It is to be appreciated that one or more of the training data and the one or more sets of transforms may be determined on-line (i.e., during the encoding of the video sequence) or off-line (e.g., prior to encoding the video sequence).

Turning to FIG. 6, an exemplary method for transform selection in a video decoder is indicated generally by the reference numeral 600. The method 600 includes a start block 605 that passes control to a function block 610. The function block 610 receives a bitstream for decoding, commences decoding the bitstream, and passes control to a function block 615. The function block 615 determines one or more of training data, one or more sets of transforms with each set representing a respective family of transforms, data already decoded, and data to be decoded, and passes control to a function block 620. The function block 620 selects a transform i depending on one or more of the training data, one or more subsets of transforms with each subset representing a respective portion of a family of transforms, the data already decoded, and the data to be decoded, and passes control to a function block 625. The function block 625 inverse transforms and inverse quantizes quantized coefficients for a block in a picture of the video sequence using selected transform i, and passes control to a function block 630. The function block 630 outputs block residue data, and passes control to an end block 699.

It is to be appreciated that one or more of the training data and the one or more sets of transforms may be determined on-line (i.e., during the decoding of the video sequence) or off-line (e.g., prior to decoding the video sequence).

Figure 7:
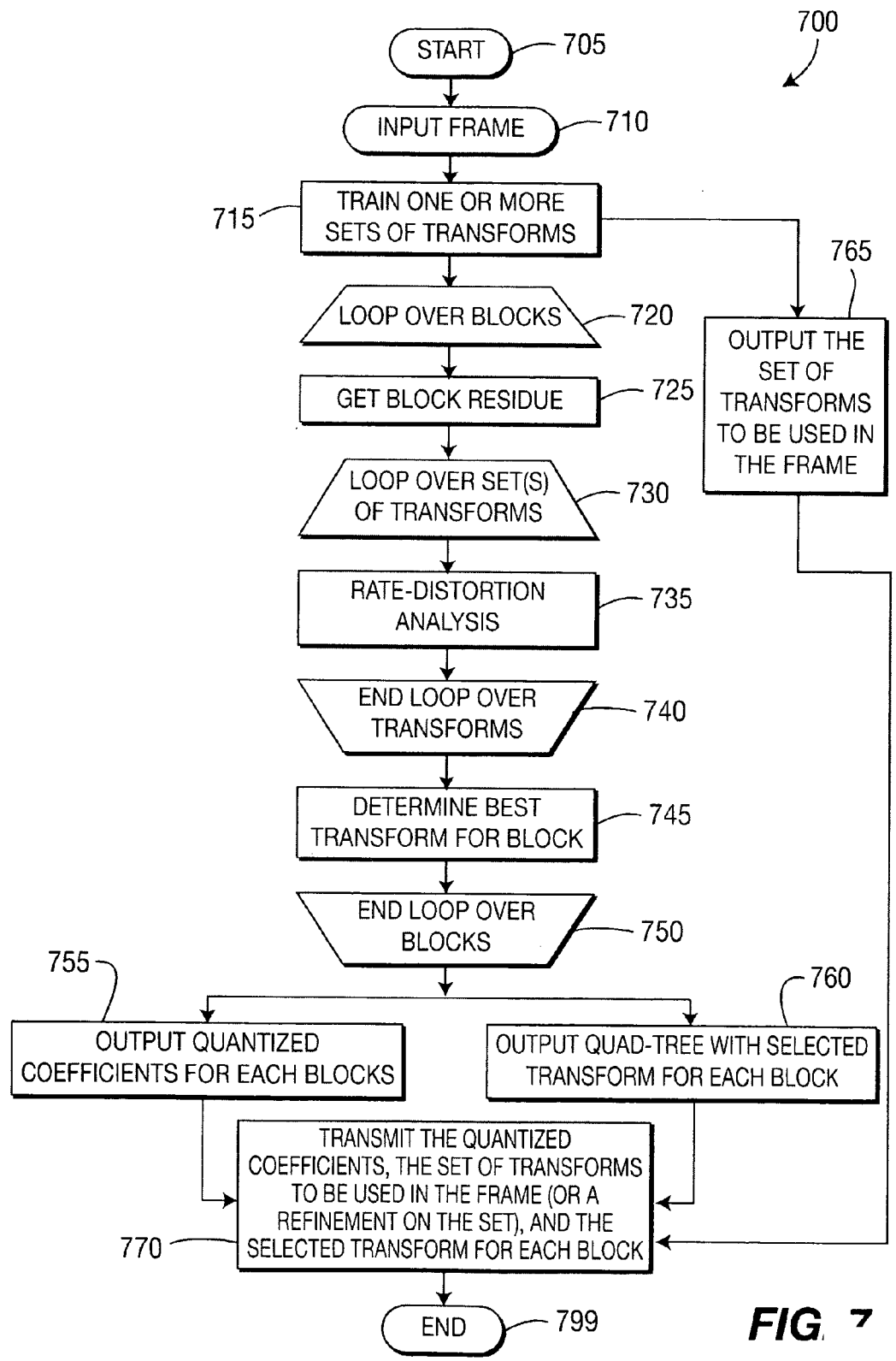
FIG. 7 is a flow diagram showing an exemplary method for transform selection and conveyance in a video encoder, in accordance with an embodiment of the present principles.

Turning to FIG. 7, an exemplary method for transform selection and conveyance in a video encoder is indicated generally by the reference numeral 700. The method 700 includes a start block 705 that passes control to a function block 710. The function block 710 receives an input frame for encoding, and passes control to a function block 715. The function block 715 trains one or more sets of transforms, and passes control to a function block 765 and a loop limit block 720. The function block 765 outputs the set of transforms to be used in the frame, and passes control to a function block 770. The loop limit block 720 performs a loop over the blocks over the input frame, and passes control to a function block 725. The function block 725 gets the block residue, and passes control to a loop limit block 730. The loop limit block 730 performs a loop over the one or more sets of transforms, and passes control to a function block 735. The function block 735 performs a rate distortion analysis with respect to the transforms in the one or more sets of transforms, and passes control to a loop limit block 740. The loop limit block 740 ends the loop over the transforms, and passes control to a function block 745. The function block 745 determines the best transform for the current block, and passes control to a loop limit block 750. The loop limit block 750 ends the loop over the blocks, and passes control to a function block 755 and a function block 760. The function block 755 outputs quantized coefficients for each of the blocks, and passes control to a function block 770. The function block 760 outputs the selected transform for each block, and passes control to the function block 770. The function block 770 transmits the quantized coefficients, the set of transforms to be used in the frame (or a refinement on the set) and the selected transform for each block in the frame, with the set of transforms to be used in the frame (or the refinement on the set) and/or the selected transform for each block in the frame being transmitted either explicitly or implicitly, and passes control to an end block 799. It is to be appreciated that with respect to function block 770, in the case of the set of transforms to be used in the frame (or the refinement on the set) and/or the selected transform for each block in the frame being sent implicitly, information indicating the set of transforms to be used in the frame (or the refinement on the set) and/or the selected transform for each block in the frame may be sent in place of the actual transforms. In such a case, the decoder can then derive the transforms from the implicit information. Moreover, the set of transforms to be used in the frame (or the refinement on the set), the selected transform for each block in the frame, and/or information representing at least one of the preceding may be sent as side information with respect to a bitstream. Further, the set of transforms to be used in the frame (or the refinement on the set), the selected transform for each block in the frame, and/or information representing at least one of the preceding may be sent using one or more flags and/or syntax elements.

Figure 8:
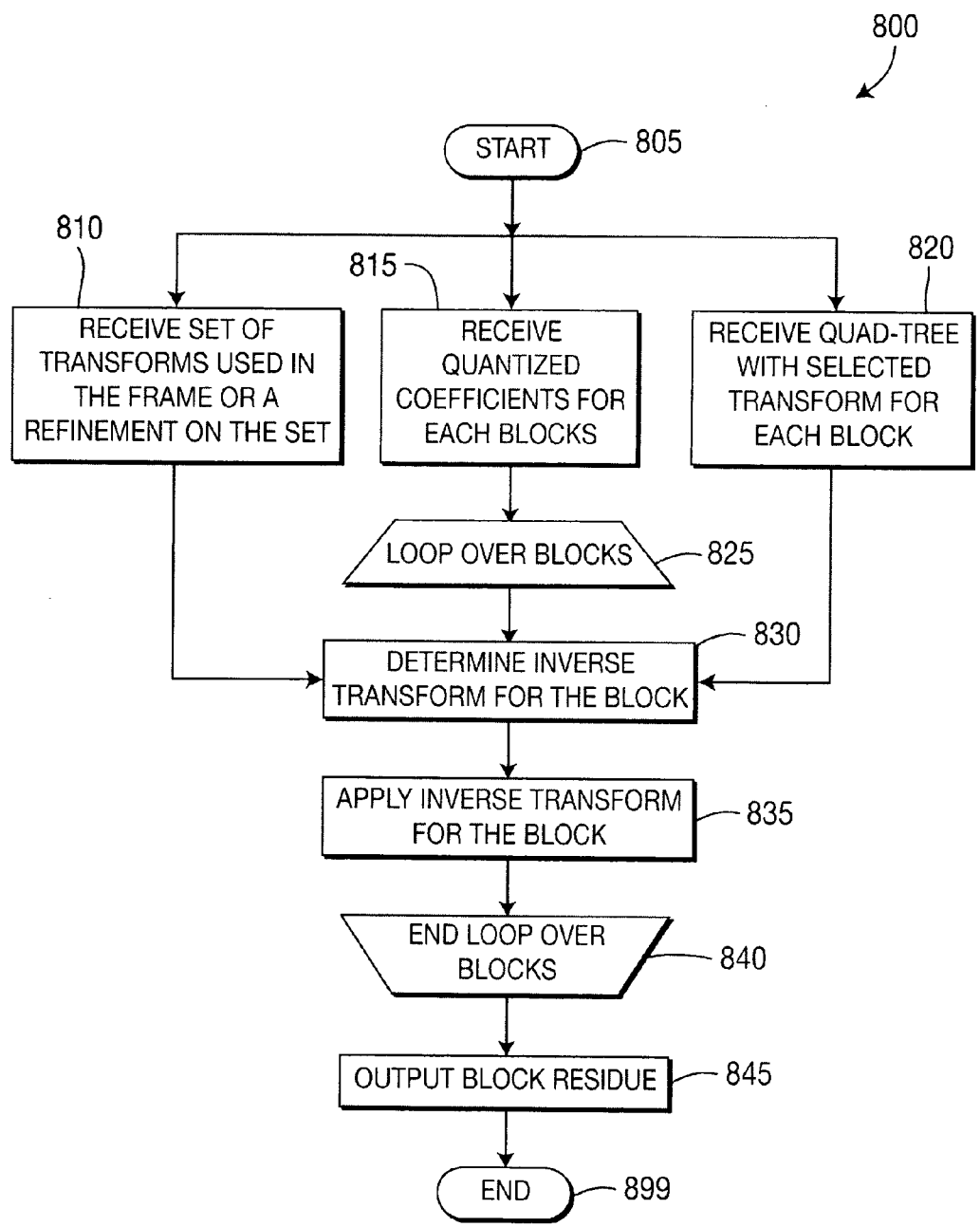
FIG. 8 is a flow diagram showing an exemplary method for transform conveyance and selection in a video decoder, in accordance with an embodiment of the present principles.

Turning to FIG. 8, an exemplary method for transform conveyance and selection in a video decoder is indicated generally by the reference numeral 800. The method 800 includes a start block 805 that passes control to a function block 810, a function block 815, and a function block 820. The function block 810 receives, either explicitly or implicitly, a set of transforms to be used for a current frame to be decoded or a refinement on the set, and passes control to a function block 830. The function block 815 receives quantized coefficients for each block in the current frame, and passes control to a loop limit block 825. The function block 820 receives, either explicitly or implicitly, the selected transform for each block in the current frame, and passes control to the function block 830. The loop limit block 825 performs a loop over the blocks in the current frame, and passes control to the function block 830. The function block 830 determines the inverse transform for a current block, and passes control to a function block 835. The function block 835 applies the determined inverse transform for the block, and passes control to a loop limit block 840. The loop limit block 840 ends the loop, and passes control to a function block 845. The function block 845 outputs a block residue for each of the blocks, and passes control to an end block 899.

It is to be appreciated that with respect to function blocks 810 and 820, in the case of the set of transforms to be used in the frame (or the refinement on the set) and/or the selected transform for each block in the frame being sent implicitly, information indicating the set of transforms to be used in the frame (or the refinement on the set) and/or the selected transform for each block in the frame may be received in place of the actual transforms. In such a case, the decoder can then derive the transforms from the implicit information (e.g., by function block 830). Moreover, the set of transforms to be used in the frame (or the refinement on the set), the selected transform for each block in the frame, and/or information representing at least one of the preceding may be received as side information with respect to the bitstream.

Figure 9:
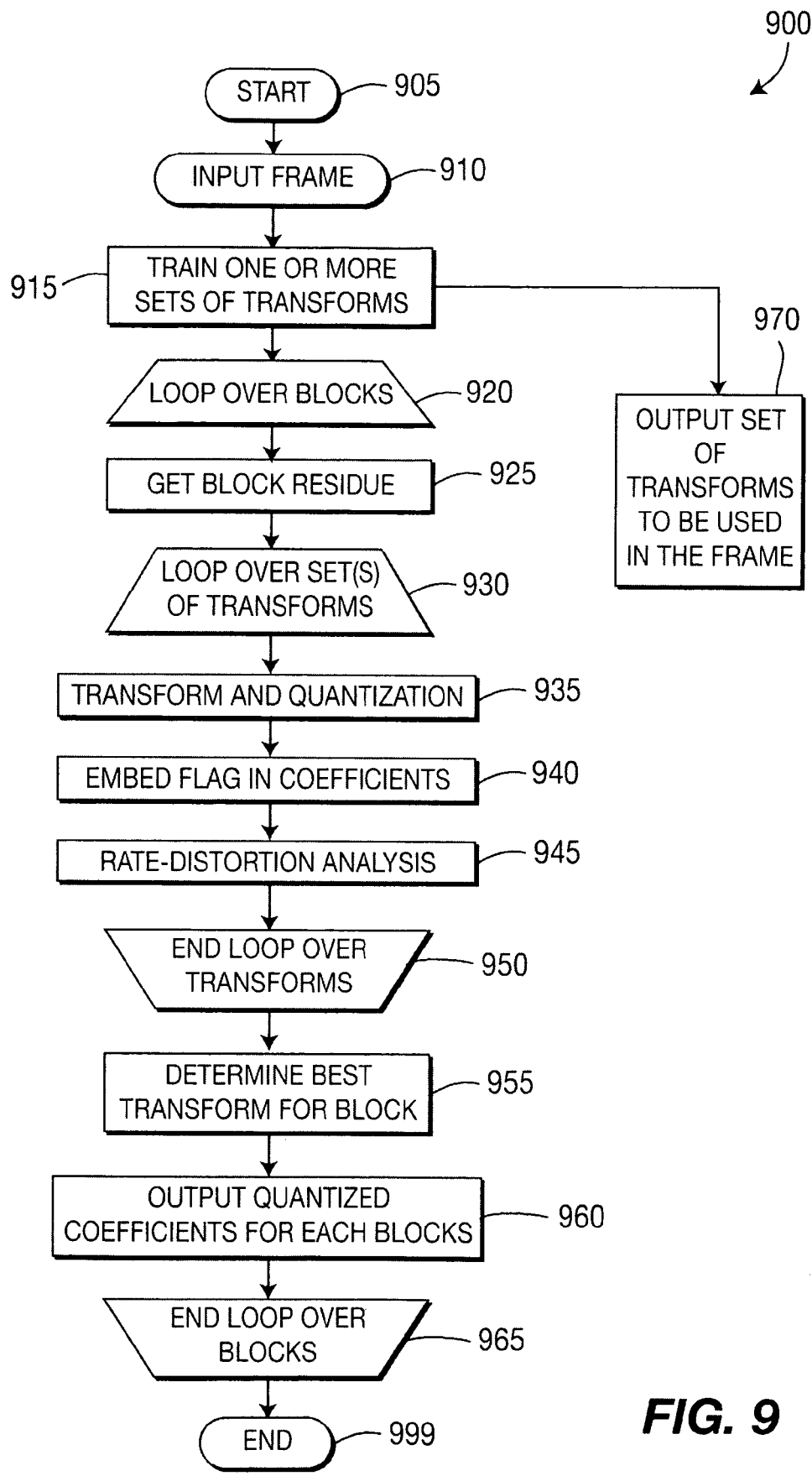
FIG. 9 is a flow diagram showing another exemplary method for transform selection and conveyance in a video encoder, in accordance with an embodiment of the present principles.

Turning to FIG. 9, another exemplary method for transform selection and conveyance in a video encoder is indicated generally by the reference numeral 900. The method 900 includes a start block 905 that passes control to a function block 910. The function block 910 inputs a frame to be encoded, and passes control to a function block 915. The function block 915 trains one or more sets of transforms, and passes control to a function block 970 and a loop limit block 920. The loop limit block 920 performs a loop over the blocks in the frame, and passes control to a function block 925. The function block 925 gets a block residue for a current block, and passes control to a loop limit block 930. The loop limit block 930 performs a loop over the one or more sets of transforms, and passes control to a function block 935. The function block 935 transforms and quantizes coefficients for the current block, and passes control to a function block 940. The function block 940 embeds a flag in the coefficients, and passes control to a function block 945. The function block 945 performs a rate-distortion (RD) analysis, and passes control to a loop limit block 950. The loop limit block 950 ends the loop over the transforms, and passes control to a function block 955. The function block 955 determines the best transform for the current block, and passes control to a function block 960. The function 960 outputs quantized coefficients for each of the blocks, and passes control to a loop limit block 965. The loop limit block ends the loop over the blocks, and passes control to an end block 999.

Figure 10:
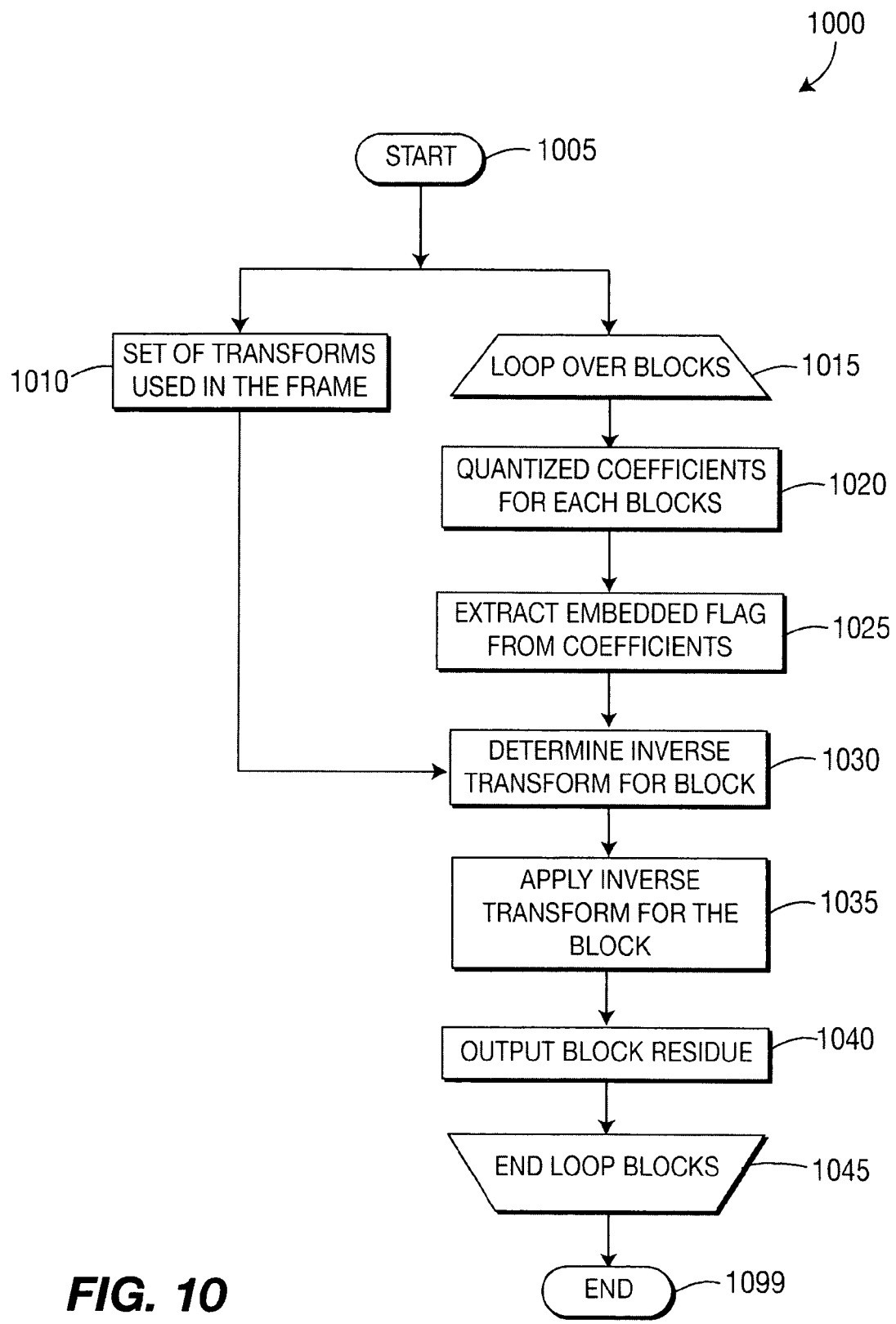
FIG. 10 is a flow diagram showing another exemplary method for transform conveyance and selection in a video decoder, in accordance with an embodiment of the present principles.

Turning to FIG. 10, another exemplary method for transform conveyance and selection in a video decoder is indicated generally by the reference numeral 1000. The method 1000 includes a start block 1005 that passes control to a function block 1010 and a loop limit block 1015. The function block 1010 receives, either explicitly or implicitly, a set of transforms to be used for a current frame to be decoded, and passes control to a function block 1030. The loop limit block 1015 performs a loop over the blocks in the current frame, and passes control to a function block 1020. The, function block 1020 receives quantized coefficients for each of the blocks in the current frame and passes control to a function block 1025. The function block 1025 extracts an embedded flag(s) from the coefficients, and passes control to the function block 1030. The function block 1030 determines an inverse transform to apply to the current block based on the embedded flag(s), and passes control to a function block 1035. The function block 1035 inverse transforms the block using the determined inverse transform, and passes control to a function block 1040. The function block 1040 outputs a block residue, and passes control to a loop limit block 1045. The loop limit block 1045 ends the loop, and passes control to an end block 1099.

A description will now be given of some of the many attendant advantages/features of the present invention, some of which have been mentioned above. For example, one advantage/feature is an apparatus having a video encoder for encoding at least a block in a picture by selecting a transform to apply to a residue of the block from a set of two or more available transforms. The transform is selected based on at least one of an inter prediction mode used to predict at least one reference for the block, one or more values corresponding to a motion vector, a value of a residue of one or more previously encoded blocks, a value of prediction data for the block, one or more transform selections of one or more neighboring reconstructed blocks, and a quantization step applied to transform coefficients for the residue of the block.

Another advantage/feature is the apparatus having the encoder as described above, wherein the set of transforms is determined off-line.

Yet another advantage/feature is the apparatus having the encoder wherein the set of transforms is determined off-line as described above, wherein the set of transforms is determined at least one of using training data and by choosing a subset of a family of transforms.

A further advantage/feature is the apparatus having the encoder as described above, wherein the transforms in the set are any of separable or non-separable, and horizontal and vertical directions of the transforms are capable of being different when the transforms are separable.

Still another advantage/feature is an apparatus having a video encoder for encoding at least a block in a picture by selecting a transform to apply to a residue of the block from a set of two or more available transforms. The video encoder sends information describing the selected transform by at least one of sending the information explicitly using one or more flags, sending the information using a tree structure in a bitstream, embedding the information within transform coefficients corresponding to the selected transform, and allowing a corresponding decoder to infer the selected transform from already decoded data.

Moreover, another advantage/feature is the apparatus having the video encoder as described above, wherein the set of transforms is determined at least one of using training data and by choosing a subset of a family of transforms.

Further, another advantage/feature is an apparatus having a video encoder for encoding at least a block in a picture in a video sequence by selecting a transform to apply to a residue of the block from a set of two or more available transforms. The set of transforms is at least one of determined and refined using reconstructed data from one or more previous pictures in the video sequence.

Also, another advantage/feature is an apparatus having a video encoder for encoding at least a block in a picture by selecting a transform to apply to a residue of the block from a set of two or more available transforms. The set of transforms is determined from data to be encoded for the block.

Additionally, another advantage/feature is the apparatus having the video encoder as described above, wherein the video encoder determines the set of transforms and sends the set of transforms to a corresponding decoder as side information.

Moreover, another advantage/feature is the apparatus having the video encoder as described above, wherein the video encoder determines the set of transforms, determines a refinement on the set of transforms that allows a corresponding decoder to predict the set of transforms from the refinement and from previously decoded data in order to derive a same set of transforms as said video encoder, and sends the refinement to the corresponding decoder.

Further, another advantage/feature is the apparatus having the video encoder as described above, wherein the video encoder determines the set of transforms from a plurality of sets of transforms and sends the set of transforms as side information.

Also, another advantage/feature is the apparatus having the video encoder as described above, wherein the video encoder determines the set of transforms from a family of transforms, the set of transforms representing a subset of the family of transforms, and wherein the video encoder sends only the subset of the family of transforms.

These and other features and advantages of the present principles may be readily ascertained by one of ordinary skill in the pertinent art based on the teachings herein. It is to be understood that the teachings of the present principles may be implemented in various forms of hardware, software, firmware, special purpose processors, or combinations thereof.

Most preferably, the teachings of the present principles are implemented as a combination of hardware and software. Moreover, the software may be implemented as an application program tangibly embodied on a program storage unit. The application program may be uploaded to, and executed by, a machine comprising any suitable architecture. Preferably, the machine is implemented on a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU. In addition, various other peripheral units may be connected to the computer platform such as an additional data storage unit and a printing unit.

It is to be further understood that, because some of the constituent system components and methods depicted in the accompanying drawings are preferably implemented in software, the actual connections between the system components or the process function blocks may differ depending upon the manner in which the present principles are programmed. Given the teachings herein, one of ordinary skill in the pertinent art will be able to contemplate these and similar implementations or configurations of the present principles.

Although the illustrative embodiments have been described herein with reference to the accompanying drawings, it is to be understood that the present principles is not limited to those precise embodiments, and that various changes and modifications may be effected therein by one of ordinary skill in the pertinent art without departing from the scope or spirit of the present principles. All such changes and modifications are intended to be included within the scope of the present principles as set forth in the appended claims.

The invention claimed is:

1. An apparatus, comprising:
a video encoder for encoding at least a block in a picture by selecting a transform to apply to a residue of the block between contiguous pictures in a video sequence from a set of two or more different transforms predetermined with respect to the block,
wherein the transform is selected responsive to at least one of:
(i) one or more values corresponding to a motion vector,
(ii) a value of a residue of one or more previously encoded blocks between contiguous pictures in the video sequence,
(iii) a value of prediction data for the block,
(iv) one or more transform selections of one or more neighboring reconstructed blocks, and
(v) a quantization step applied to transform coefficients for the residue of the block,
wherein the set of two or more transforms is derived from reconstructed video data from one or more previous pictures.

2. The apparatus of claim 1, wherein the set of different transforms is determined off-line.

3. The apparatus of claim 2, wherein the set of different transforms is determined by at least one of:
  (i) using training data, and
  (ii) choosing the set of two or more transforms with respect to the block.

4. The apparatus of claim 1, wherein the transforms in the set are any of separable or non-separable, and horizontal and vertical directions of the transforms are capable of being different when the transforms are separable.

5. The apparatus of claim 1, wherein information describing the selected transform is explicitly signaled only for block sizes greater than a threshold block size.

6. The apparatus of claim 1, wherein a flag describing the selected transform is embedded in coefficients of the transform when block sizes are less than a threshold block size.

7. In a video encoder, a method, comprising:
  encoding at least a block in a picture by selecting a transform to apply to a residue of the block between contiguous pictures in a video sequence from a set of two or more different transforms predetermined with respect to the block,
  wherein the transform is selected responsive to at least one of:
  (i) one or more values corresponding to a motion vector,
  (ii) a value of a residue of one or more previously encoded blocks between contiguous pictures in the video sequence,
  (iii) a value of prediction data for the block,
  (iv) one or more transform selections of one or more neighboring reconstructed blocks, and
  (v) a quantization step applied to transform coefficients for the residue of the block,
  wherein the set of two or more transforms is derived from reconstructed video data from one or more previous pictures.

8. The method of claim 7, further comprising determining the set of different transforms off-line.

9. The method of claim 8, wherein the set of different transforms is determined by at least one of:
  (i) using training data, and
  (ii) choosing the set of two or more transforms with respect to the block.

10. The method of claim 7, wherein the transforms in the set are any of separable or non-separable, and horizontal and vertical directions of the transforms are capable of being different when the transforms are separable.

11. The method of claim 7, wherein information describing the selected transform is explicitly signaled only for block sizes greater than a threshold block size.

12. The method of claim 7, wherein a flag describing the selected transform is embedded in coefficients of the transform when block sizes are less than a threshold block size.

13. An apparatus, comprising:
  a video decoder for decoding at least a block in a picture by determining an inverse transform to apply to quantized coefficients of the block from a set of two or more different inverse transforms corresponding to a set of two or more transforms determined with respect to the block by a corresponding video encoder,
  wherein the inverse transform is determined responsive to at least one of:
  (i) one or more values corresponding to a motion vector,
  (ii) a value of a residue of one or more previously encoded blocks between contiguous pictures in the video sequence,
  (iii) a value of prediction data for the block,
  (iv) one or more transform selections of one or more neighboring reconstructed blocks, and
  (v) a quantization step applied to transform coefficients for the residue of the block,
  wherein the set of two or more transforms is derived from reconstructed video data from one or more previous pictures.

14. In a video decoder, a method, comprising:
  decoding at least a block in a picture by determining an inverse transform to apply to quantized coefficients of the block from a set of two or more different inverse transforms corresponding to a set of two or more transforms determined with respect to the block by a corresponding video encoder,
  wherein the inverse transform is determined responsive to at least one of:
  (i) one or more values corresponding to a motion vector,
  (ii) a value of a residue of one or more previously encoded blocks between contiguous pictures in the video sequence,
  (iii) a value of prediction data for the block,
  (iv) one or more transform selections of one or more neighboring reconstructed blocks, and
  (v) a quantization step applied to transform coefficients for the residue of the block,
  wherein the set of two or more transforms is derived from reconstructed video data from one or more previous pictures.

15. A non-transitory computer-readable storage media having computer program code for performing a method, the method comprising:
  encoding data corresponding to at least one block in a picture by selecting a transform to apply to a residue of the block between contiguous pictures in a video sequence from a set of two or more different transforms predetermined with respect to the block,
  wherein the transform is selected responsive to at least one of:
  (i) one or more values corresponding to a motion vector,
  (ii) a value of a residue of one or more previously encoded blocks between contiguous pictures in the video sequence,
  (iii) a value of prediction data for the block,
  (iv) one or more transform selections of one or more neighboring reconstructed blocks, and
  (v) a quantization step applied to transform coefficients for the residue of the block,
  wherein the set of two or more transforms is derived from reconstructed video data from one or more previous pictures.

16. The non-transitory computer-readable storage media of claim 15, wherein information describing the selected transform is explicitly signaled only for block sizes greater than a threshold block size.

17. The non-transitory computer-readable storage media of claim 15, wherein a flag describing the selected transform is embedded in coefficients of the transform when block sizes are less than a threshold block size.

* * * * *